July 4, 1967     H. N. VOGT     3,328,913
PLANT STARTING CONTAINER
Filed Oct. 19, 1965
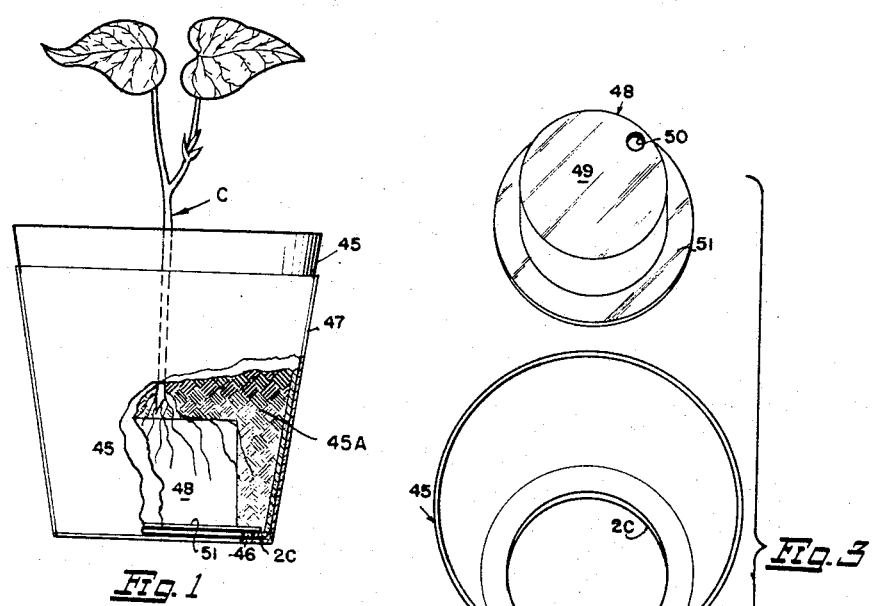
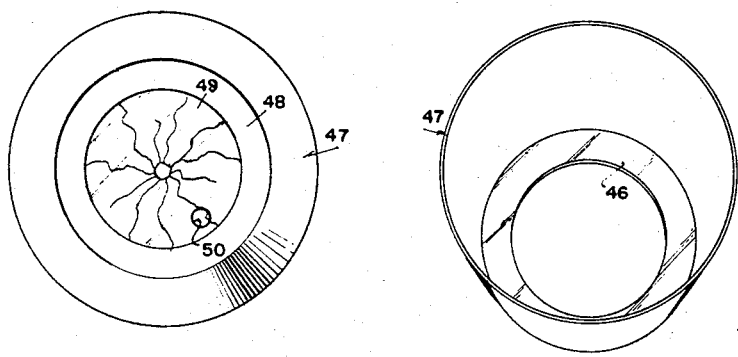
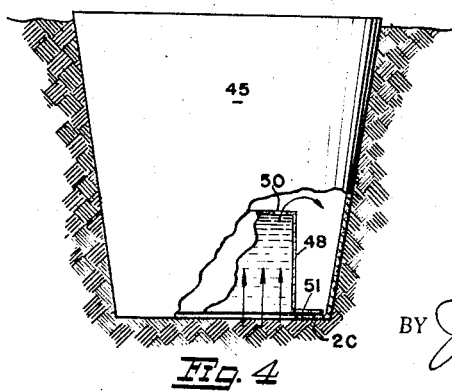
HOWARD N. VOGT
INVENTOR.
BY *James D. Givnan*
ATT'Y

United States Patent Office 3,328,913
Patented July 4, 1967

3,328,913
PLANT STARTING CONTAINER
Howard N. Vogt, P.O. Box 55,
Falls City, Oreg. 97344
Filed Oct. 19, 1965, Ser. No. 497,781
1 Claim. (Cl. 47—34)

This invention relates to a method of and means for vegetative propagation by the planting of cuttings in containers until ready for transplanting as determined by adventitious root development.

One of the principal objects of the invention is the provision of a container of the character described and new and novel transparent root-spreading means removably disposed on the interior thereof whereby the progress of root growth may be observed and thus prevent loss of plant life by premature transplanting.

Another object of the invention is the provision of a container preferably made of compressed fibrous material such as peat or the like which will disappear by disintegration after planting and thus leave the insert to continue another of its objectives by spreading the root growth into gradually increasing feeding areas and wherein through the medium of an air escape opening in the insert the roots will partake of water from saturated soil surrounding the insert.

A still further object is the provision of a modified form of container made of transparent material disposed within or surrounded by a removable enclosure of opaque material so that a cutting planted in the container can be kept in relative darkness until it is ready for transplanting which condition can be readily observed by removing the container from the receptacle.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of a container and receptacle nested one within the other and with fragments broken away to reveal a root spreading insert disposed within the container.

FIGURE 2 is a bottom elevational view of FIGURE 1.

FIGURE 3 is a composite view of the components of FIGURE 1, and

FIGURE 4 shows the container of FIGURE 1 planted in the ground and illustrating diagrammatically the manner in which irrigation water from surrounding saturated soil finds its way up through and out of the insert for distribution through the root area of the planted cutting, not shown.

Referring now more particularly to the drawings wherein like reference characters designate like parts and particularly FIGURES 1 and 2 thereof, reference numeral 45 indicates a container preferably, though not restrictively, made of compressed fibrous material such as peat or the like which in time will disintegrate after planting in the ground. The bottom wall of the container has a concentric opening therein which provides an annular flange 2C for holding a root spreading insert 48 made of transparent material such as plastic or the like for root inspection purposes and preferably, though not restrictively, of inverted cup shape whose top wall has an air escapement opening 50 therein. The bottom of the insert has an annular flange 51 and thereby supported upon the matching flange 2C of the container 45.

The container 45 is filled with soil 45A for the planting therein of a cutting indicated generally at C whose stem extends downwardly into touching contact or nearly so with the top wall of the insert, as shown, so that the root growth from the stem will be deflected radially over the top wall of the insert and spread downwardly and outwardly along the walls of the insert.

By this arrangement a grower, by inverting the container into the position shown in FIGURE 2, may observe root progress and thus eliminate the risk of prematurely transplanting the cutting into the ground. As previously stated, the container and insert, after satisfactory root growth has become apparent, are planted in the ground as a unit, then after disappearance of the container by disintegration irrigation water from surrounding saturated ground will accumulate within the insert which then serves as a reservoir for supplying water through the air escape opening 50 to the surrounding root growing areas.

As clearly shown in FIGURES 1 and 2, the root growth in its radial progress outwardly over the top wall of each insert and downwardly relative to the side walls thereof can be readily observed by tilting the container and its related parts, as aforesaid, preparatory to transplanting. This spreading of the roots is highly beneficial to their continuing growth into ever increasing feeding areas wherein they partake of the full benefit of proper irrigation by water from surrounding saturated soil working its way upwardly through the inserts and out through the air escape openings therein for infiltration throughout the root growing and feeding areas.

While I have shown a particular form of embodiment of my invention, I am aware that many minor changes therein will readily suggest themselves to others skilled in the art without departing from the spirit and scope of the invention. Having thus described by invention, what I claim as new and desire to protect by Letters Patent is:

A vertically disposed planting container for vegetative propagation of a cutting, comprising in combination,
 a receptacle for the container made of transparent material open at its top and bottom ends and having an internal annular flange at its bottom end,
 said container of opaque compressed fibrous material open at its top and bottom ends and having an internal annular flange at its bottom end and thereby supported upon said flange of the receptacle,
 a hollow circular downwardly opening insert of transparent material disposed within the container having an air escape opening in its top wall and an external annular flange at its bottom end and thereby supported upon the flange of said container whereby adventitious root development will be in a radial outward and downward direction relative to said insert and visible through the open bottom ends of said receptacle and container and through the transparency of said insert.

References Cited

UNITED STATES PATENTS

| 515,032 | 2/1894 | Vestal | 47—37 X |
| 1,996,898 | 4/1935 | Brandell | 47—34 |

FOREIGN PATENTS

| 103,027 | 1/1917 | Great Britain. |
| 27,744 | 1912 | Great Britain. |

ABRAHAM G. STONE, Primary Examiner.

A. E. KOPECKI, R. CARTER, Assistant Examiners.